Patented Sept. 28, 1948

2,450,220

UNITED STATES PATENT OFFICE 2,450,220

TEXTURE-STABLE LITHIUM BASE GREASE

Harry V. Ashburn, Glenham, and Oney P. Puryear, Fishkill, N. Y., assignors to The Texas Company, New York, N. Y., a corporation of Delaware No Drawing. Application May 3, 1945,
Serial No. 591,842

2 Claims. (Cl. 252—41)

This invention relates to an improved lubricating grease composition and particularly to a texture-stable lithium base grease and methods of preparing the same.

In general, lithium base greases prepared from saturated fats or fatty acids possess a high dropping point and are water-resistant. These properties are particularly desirable in that they permit lubrication over a wide temperature range and minimize the solubilizing or leaching effect of water and moisture condensation on the grease. However, there are certain difficulties associated with the production of these greases, together with certain undesirable performance characteristics, which prevent any large scale acceptance thereof as a commercial lubricating grease.

In the preparation of the conventional lithium base grease, a slurry of a lithium soap, such as the stearate, which is either preformed or prepared in situ, and a mineral oil, are heated to temperatures of around 360-500° F. until a homogeneous solution is obtained. This solution of lithium soap in oil is then drawn from the kettle and allowed to cool statically until a gel structure is set up. The cooled gel is then subjected to a milling operation where it is homogenized to a homogeneous grease composition. It becomes quite apparent that the efficiency and economies of such a method are quite poor, due to the high temperature operation, special equipment required, and the lack of control over the consistency and yield of the final product.

On the other hand, the greases prepared from hydroxy fatty acids possess a peculiar characteristic in that they harden appreciably under conditions of high shearing stresses and possess comparatively poor water-resistant properties. For certain types of lubrication this hardening characteristic becomes as bad as the softening characteristics of the conventional lithium base greases, since a grease composition which hardens provides poor lubrication due to channelling of the grease by the moving parts. This hardening effect also prevents uniform lubrication in that the grease is no longer of the consistency required to work into all the lubricating surfaces.

In accordance with the invention it has been found that lithium base greases prepared from soap-forming hydroxy fatty acids may be improved to such an extent that the grease is capable of continued operation under conditions of high shearing stress, with negligible change in structure, and very little change in consistency, together with a marked improvement in the water-resistant properties thereof.

The particular advantage of lithium base greases prepared from hydroxy fatty acid is the fact that such greases may be prepared by an efficient and economical method of operation which requires a minimum of equipment, provides an accurate control of consistency and yield of product and may be carried out at temperatures attainable in a steam-jacketed kettle. These improvements in texture-stability and water-resistance of lithium base greases prepared from hydroxy fatty acids are achieved by the use of a blend of the hydroxy fatty acid with a soap-forming fat or fatty acids as the acidic component of the lithium soap. It has been found that up to 65% of a fatty acid material may be blended with a hydroxy fatty acid to provide a lithium soap grease possessing substantially constant consistency after being subjected to high shearing stresses.

The particular ratio of fatty acid material to hydroxy fatty acid to be used in the blend will depend upon the type and degree of improvement desired. It has been noted that as the amount of fat or fatty acid in the blend is increased up to 65% the water-resistant properties and the texture-stability of the grease is improved. However, on the other hand, the increase in fatty acid material gradually lowers the yield of the final grease composition. In all cases, however, acid blends containing up to 65% of fat or fatty acid and at least 35% hydroxy fatty acid, may be manufactured in accordance with a simple low temperature method of manufacture as distinguished from the high temperature complex methods required by the conventional lithium base greases.

The hydroxy fatty acids contemplated by the invention are those containing twelve or more carbon atoms and one or more hydroxyl radicals separated from the carboxyl group by at least one carbon atom. In the following detailed description of the invention 12-hydroxy stearic acid is used as the representative soap-forming hydroxy fatty acid. It is to be understood, however, that the invention is not limited to this particular acid and that other soap-forming hydroxy fatty acids, or mixtures thereof, may be used in the preparation of lithium base greases by the low temperature method of manufacture. As an example, the hydroxy fatty acids produced by the catalytic oxidation of hydrocarbon oils and waxes which have been extracted and fractionated to the desired molecular range may also be used in the practice of the invention.

Furthermore, the type of service for which the grease is intended bears upon the choice of the fat or fatty acid to be blended with the hydroxy fatty acid. In general, the invention contemplates any of the recognized fatty acid materials, which include the fats or fatty acids normally used in grease manufacture provided they are essentially saturated in character. These fats or fatty acids include mixtures of fatty acids found in naturally-occurring fats and oil, together with fractionated components thereof. The fatty acids may be a mixture of acids split off from these fats or prepared from hydrogenation of fish oils, etc., or the individual acids themselves. In the preparation of the low temperature lithium grease referred to above, it has been found preferable to utilize the fatty acids rather than glycerides and, in particular, stearic acid.

The oil component of the subject grease composition may be described broadly as an oleaginous vehicle, which would include the conventional mineral lubricating oils, the synthetic lubricating oils prepared by cracking and polymerizing products of the Fischer-Tropsch process and the like, or a synthetic oleaginous compound within the lubricating oil viscosity range. The synthetic oleaginous compounds are those organic compounds which possess lubricating characteristics and may be substituted in whole or in part for the conventional mineral lubricating oils. Examples of these compounds are the aliphatic dicarboxylic acid esters, such as the alkyl esters of sebacic acid, the high molecular weight aliphatic ethers, such as normal hexyl ether, and the aromatic acid esters, such as the alkyl esters of benzoic or phthalic acids. The choice of the oil component bears directly upon the type of lubrication required of the finished product. For example, in a low temperature lithium base grease, a mineral lubricating oil within the viscosity range of 40–70 S. U. S. at 100° F., a low pour point, and a viscosity index of 30 or more is preferred.

Where a high degree of oxidation stability is required an oxidation inhibitor is preferably incorporated. For these lithium base greases the aromatic amine type of inhibitor has been found particularly effective. Of this class of inhibitors the poly-nuclear aromatic amines, such as tetramethyl diamino diphenyl methane, diphenyl amine, and phenyl alpha naphthylamine are preferred.

The preparation of these greases is carried out by saponifying a blend of the soap-forming hydroxy fatty acid and saturated fat or fatty acid with a basic lithium compound. The acidic components may be saponified separately in situ. The saponification product is then dehydrated and the oil component is added until the desired consistency is reached. The total operation is easily conducted in a steam-jacketed open kettle and the resulting finished lithium base grease requires no homogenization or further treatment prior to actual use.

The following specific example illustrates a method of preparation of a low temperature lithium base grease using a 50-50 blend of 12-hydroxy stearic acid and triple-pressed stearic acid as the acid component of the grease:

A steam-heated kettle fitted with stirring mechanism was charged with 12.9 pounds of a 10.4% lithium hydroxide solution and 4.0 pounds of water. The solution was heated to 180° F. with stirring at 35 R. P. M. 7.5 pounds of 12-hydroxy stearic acid (saponification No.=194, neutralization No.=183, hydroxyl value=193) and 15.0 pounds of mineral oil were added. The mineral oil used in the preparation of the grease possessed the following characteristics:

| | |
|---|---|
| Gravity, °A. P. I. | 26.8 |
| Flash, COC, °F. | 293 |
| Fire, COC, °F. | 340 |
| Viscosity, S. U. at 100° F. | 60.5 |
| Viscosity, S. U. at 210° F. | 34.7 |
| Viscosity index | 64.5 |

7.5 pounds of triple-pressed stearic acid (saponification No.=210, neutralization No.=210, iodine No.=2) were then added and the kettle contents stirred at 180–190° F. for four hours. The saponification product was then dehydrated at a temperature of 290–310° F. and held at this temperature for four hours. The temperature was then reduced and the addition of the mineral oil was begun, slowly at first and faster as the grease became softer. At 201° F. 121 grams of triple-pressed stearic acid and 117 grams of phenyl alpha naphthylamine were added. After 41.0 pounds of oil (including that in the charge) were added control determinations indicated a free fatty acid content of 0.65% and an ASTM worked penetration at 77° F. of 272. The stirring speed was then reduced to 18 R. P. M. and mineral oil added in 3 to 6 pound increments until a control worked penetration of 334 at 78° F. was obtained, ading sufficient phenyl alpha naphthylamine to keep a concentration of 0.5%, based on the final composition. This required an additional 17 pounds of mineral oil and 39.1 grams of phenyl alpha naphthylamine. The grease was then drawn from the kettle and pumped through three 60-mesh screens. The tests obtained thereon are as follows:

| | Per cent |
|---|---|
| Lithium soap | 22.8 |
| Free alkali (LiOH)[1] | 0.11 |
| Free fatty acid (Oleic)[1] | 0.48 |
| Free neutral fat[1] | 0.5 |
| Phenyl alpha naphthylamine (calc.) | 0.5 |

[1] "The Institute Spokesman," National Lubricating Grease Institute, January, 1944. "Test Methods for Determining Free Acid and Free Alkali in Greases."

In order to determine the texture-stabilizing properties in resistance to shear at high temperatures obtained by various blends of hydroxy fatty acid and fatty acid three greases were subjected to a so-called dynamic shear test. This test was conducted in an apparatus consisting of a perforated piston reciprocating within a closed cylinder maintained at a constant temperature. In this test the greases were charged to the cylinder maintained at a temperature of 225° F. and the piston then reciprocated at 49 strokes per minute for a period of 8 hours. At the conclusion of the test the grease was removed and miniature penetrations taken. These miniature penetrations were then compared with the miniature penetrations of the greases taken before the test to determine the effect of the shearing action on the grease structure. The results obtained are set down as the differences in penetrations, the negative values indicating a hardening of consistency as measured by a decrease in the miniature penetrations. The three greases used in this test are low temperature lithium base greases designated as "Greases 1, 2 and 3."

Grease No. 1 prepared from 100% 12-hydroxy stearic acid.

Grease No. 2 prepared from a blend of 50% 12-hydroxy stearic acid and 50% triple-pressed stearic acid.

Grease No. 3 prepared from a blend of 40% 12-hydroxy stearic acid and 60% triple-pressed stearic acid.

SHEAR TEST

*Differences in miniature penetration* [1]

| | |
|---|---|
| Grease No. 1 | −146 |
| Grease No. 2 | −96 |
| Grease No. 3 | −49 |

[1] "Miniature Penetrometer for Determining the Consistency of Lubricating Greases." Ind. Eng. Chem., Analytical edition, vol. II, page 108, February 15, 1939.

As previously mentioned, the lithium base greases prepared from hydroxy fatty acids as the sole acid component possess comparatively poor water-resistant properties. These properties are also improved, in accordance with the invention, by the blending of soap-forming fatty acids with the hydroxy fatty acids, as indicated by the following test results. The water-absorption test used in the determination of the water-resistant properties is that described in the Army and Navy specification AN–G–3a (Amdt. of March, 1943). In this test small increments of water (5%) are worked into a 20-gram sample of grease until no further increments can be worked into the grease within five minutes. The water resistance of the grease is then determined by the percentage of water incorporated.

The following test results were obtained on three low-temperature lithium base greases designated as "Greases A, B and C."

Grease A prepared from 100% 12-hydroxy stearic acid as the acid component.

Grease B prepared from a blend of 50% 12-hydroxy stearic acid and 50% triple-pressed stearic acid.

Grease C prepared from a blend of 40% 12-hydroxy stearic acid and 60% triple-pressed stearic acid.

The tests obtained are as follows:

WATER ABSORPTION TEST

*Percent absorbed*

| | |
|---|---|
| Grease A | 45 |
| Grease B | 30 |
| Grease C | 10 |

As may be seen from the foregoing test results, the blends of hydroxy fatty acids with conventional saturated fatty acids improve both the texture-stabilizing and water-resistant properties of the resulting lithium base grease.

The low temperature method disclosed herein for manufacturing a lithium base grease containing a lithium soap of a soap-forming hydroxy fatty acid as the essential soap constituent is claimed in our copending application, Serial No. 588,890, filed April 17, 1945.

Obviously many modifications and variations of the invention, as hereinbefore set forth, may be made without departing from the spirit and scope thereof and, therefore, only such limitations should be imposed as are indicated in the appended claims.

We claim:

1. A method of preparing at temperatures attainable in a steam-jacketed kettle, a texture-stable and water-resistant gel-type grease consisting of lithium soap as the entire soap content thereof, said lithium base grease being resistant to substantial softening and also resistant to substantial hardening when subjected to high shearing stresses of the character herein described, which comprises saponifying with a basic lithium compound at a mildly elevated temperature a blend consisting of 35–50% by weight of a soap-forming hydroxy fatty acid, and 65–50% by weight of a soap-forming saturated fatty acid, then heating the resulting saponified reaction product to a higher temperature not substantially exceeding about 310° F. to dehydrate the same, thereafter lowering the temperature and adding an oleaginous vehicle as the product cools and until the desired consistency is obtained, and finally drawing the resulting mix to obtain the texture-stable and water-resistant gel-type grease as a final product.

2. A method of preparing at temperatures attainable in a steam-jacketed kettle, a texture-stable and water-resistant gel-type grease consisting of lithium soap as the entire soap content thereof, said lithium base grease being resistant to substantial softening and also resistant to substantial hardening when subjected to high shearing stresses of the character herein described, which comprises saponifying with a basic lithium compound at a mildly elevated temperature a blend consisting of 35–50% by weight of 12-hydroxy stearic acid and 65–50% by weight of stearic acid, then heating the resulting saponified reaction product to a higher temperature not substantially exceeding about 310° F. to dehydrate the same, thereafter lowering the temperature and adding an oleaginous vehicle as the product cools and until the desired consistency is obtained, and finally drawing the resulting mix to obtain the texture-stable and water-resistant gel-type grease as a final product.

HARRY V. ASHBURN.
ONEY P. PURYEAR.

REFERENCES CITED

The following references are of record in the file of this patent:

UNITED STATES PATENTS

| Number | Name | Date |
|---|---|---|
| 2,303,256 | Camelford | Nov. 24, 1942 |
| 2,351,384 | Woods et al. | June 13, 1944 |
| 2,355,009 | Morway et al. | Aug. 1, 1944 |
| 2,397,956 | Fraser | Apr. 9, 1946 |